(12) United States Patent
McHatet

(10) Patent No.: US 10,484,522 B1
(45) Date of Patent: Nov. 19, 2019

(54) UTILITY CASE FOR ELECTRONIC DEVICES

(71) Applicant: Hamid McHatet, Miami, FL (US)

(72) Inventor: Hamid McHatet, Miami, FL (US)

(*) Notice: Subject to any disclaimer, the term of this patent is extended or adjusted under 35 U.S.C. 154(b) by 109 days.

(21) Appl. No.: 15/729,746

(22) Filed: Oct. 11, 2017

Related U.S. Application Data

(63) Continuation-in-part of application No. 15/407,078, filed on Jan. 16, 2017, now Pat. No. 9,887,726.

(51) Int. Cl.
| | |
|---|---|
| *H04M 1/04* | (2006.01) |
| *H04B 1/3888* | (2015.01) |
| *A45C 11/00* | (2006.01) |
| *A45F 5/10* | (2006.01) |
| *A45C 13/10* | (2006.01) |

(52) U.S. Cl.
CPC .............. *H04M 1/04* (2013.01); *A45C 11/00* (2013.01); *A45C 13/1069* (2013.01); *A45F 5/10* (2013.01); *H04B 1/3888* (2013.01); *A45C 2011/002* (2013.01); *A45C 2011/003* (2013.01); *A45F 2005/1006* (2013.01)

(58) Field of Classification Search
CPC ....... H04B 1/3888; A45C 13/10; A45C 11/00; H04M 1/04

USPC ........................ 455/575.1, 575.6, 575.8, 90.3
See application file for complete search history.

(56) References Cited

U.S. PATENT DOCUMENTS

| | | | |
|---|---|---|---|
| 2002/0080593 A1* | 6/2002 | Tsuge ................... | H05K 9/0026 361/818 |
| 2011/0089078 A1* | 4/2011 | Ziemba ..................... | A45C 1/04 206/570 |
| 2015/0320168 A1* | 11/2015 | Hoffman ................ | A45C 13/02 206/37 |
| 2017/0194997 A1* | 7/2017 | Tu ......................... | H04B 1/3888 |

* cited by examiner

Primary Examiner — John J Lee
(74) Attorney, Agent, or Firm — Albert Bordas, P.A.

(57) ABSTRACT

A utility case for electronic devices that has an exterior case, a shield having a concave face and a convex face, a magnet, a housing, a plate, an insert, an interior case, and an exterior case ring. The exterior case has a lock assembly at an interior face, which has a containing wall inner side. The lock assembly comprises an interior edge, and a containing wall interior face. The housing has a lip defined at the locking face. The insert fits within the magnet, the magnet adheres to the plate, and the lip contains the plate, when the housing is placed onto the lock assembly. The shield is positioned in between the insert and the exterior case, and the housing is positioned in between the interior case and the exterior case when the housing is placed onto the lock assembly.

17 Claims, 5 Drawing Sheets

UTILITY CASE FOR ELECTRONIC DEVICES

OTHER RELATED APPLICATIONS

The present application is a continuation-in-part of pending U.S. patent application Ser. No. 15/407,078, filed on Jan. 16, 2017, which is hereby incorporated by reference.

BACKGROUND OF THE INVENTION

Field of the Invention

The present invention relates to utility cases, and more particularly, to protective cases for electronic devices.

Description of the Related Art

Applicant is not aware of any prior art that suggests the novel features of the present invention.

SUMMARY OF THE INVENTION

The present invention is a utility case for electronic devices, comprising an exterior case, a shield comprising a concave face and a convex face, a magnet, a housing, a plate, an insert, an interior case, and an exterior case ring.

The concave face and the convex face are defined by an inner perimeter edge. Extending from the inner perimeter edge is a perimeter wall, which comprises at least one perimeter wall hole.

The exterior case comprises a lock assembly at an interior face, and the lock assembly comprises a containing wall inner side having a canal. The lock assembly also comprises an interior edge, a containing wall interior face and at least one post.

The magnet comprises an angled wall, an inner sidewall and an outer sidewall. The magnet further comprises a flat wall and an external wall.

The housing comprises a locking face and an outer sidewall having a ridge. The housing further comprises at least one hole extending from the locking face to an inner face. The housing comprises a lip defined at the locking face. The canal receives the ridge when the housing is placed onto the lock assembly. The at least one perimeter wall hole and the at least one hole receive a respective at least one post when the shield and the housing are respectively placed onto the lock assembly.

The insert fits within the magnet, the magnet adheres to the plate, and the lip contains the plate when the housing is placed onto the lock assembly. The shield is positioned in between the insert and the exterior case, and the housing is positioned in between the interior case and the exterior case when the housing is placed onto the lock assembly.

It is therefore one of the main objects of the present invention to provide utility case for electronic devices for computers such as, but not limited to, cell phones, smart phones, tablets, or any other electronic devices.

It is another object of this invention to provide a utility case for electronic devices that is volumetrically efficient for carrying, transporting, and storage.

It is another object of this invention to provide a utility case for electronic devices that can be readily assembled and disassembled without the need of any special tools.

It is another object of this invention to provide a utility case for electronic devices, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
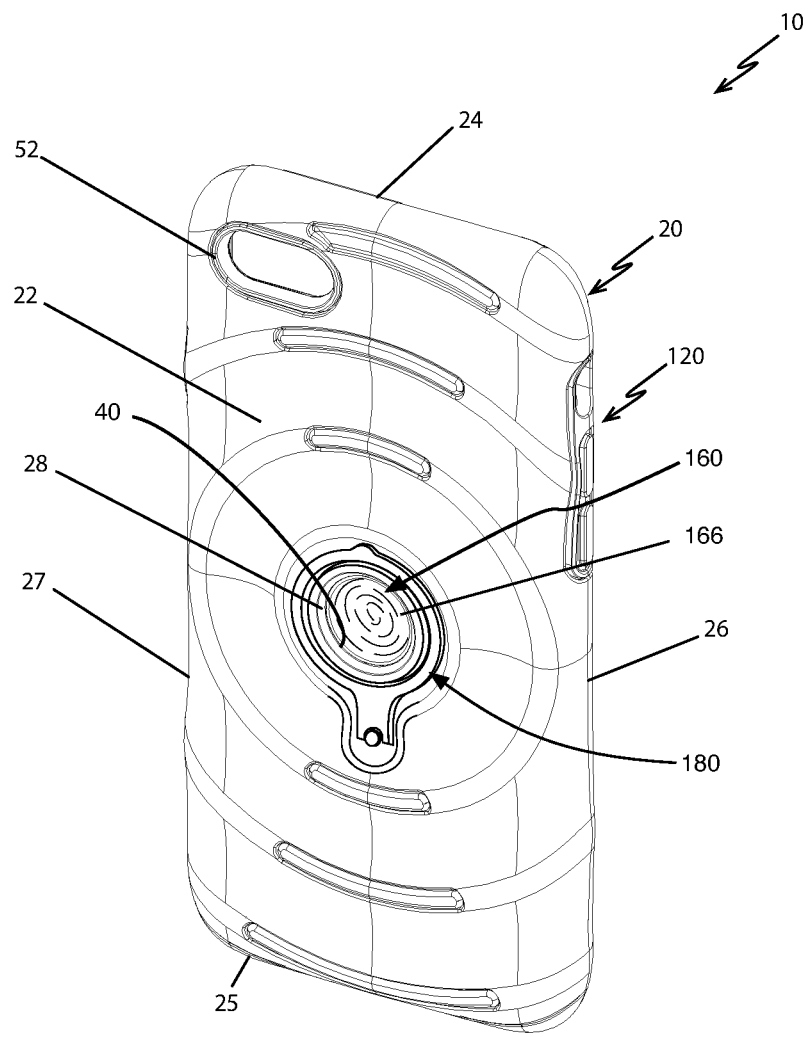
FIG. 1 represents a front isometric view of a utility case for electronic devices assembled.

Referring now to the drawings, the present invention is a utility case for electronic devices and is generally referred to with numeral 10. It can be observed that it basically includes exterior case 20, magnet 100, housing 60, plate 80, insert 90, interior case 120, shield 160, and exterior case ring 180.

Figure 2:
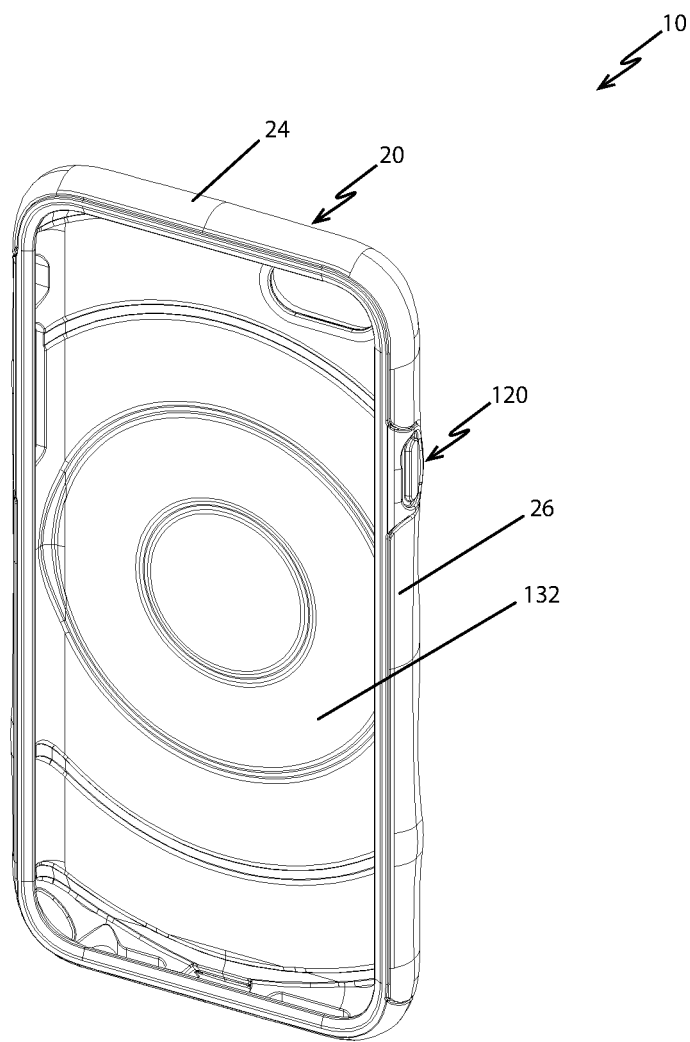
FIG. 2 is a rear isometric view of the utility case for electronic devices assembled.
Figure 4:
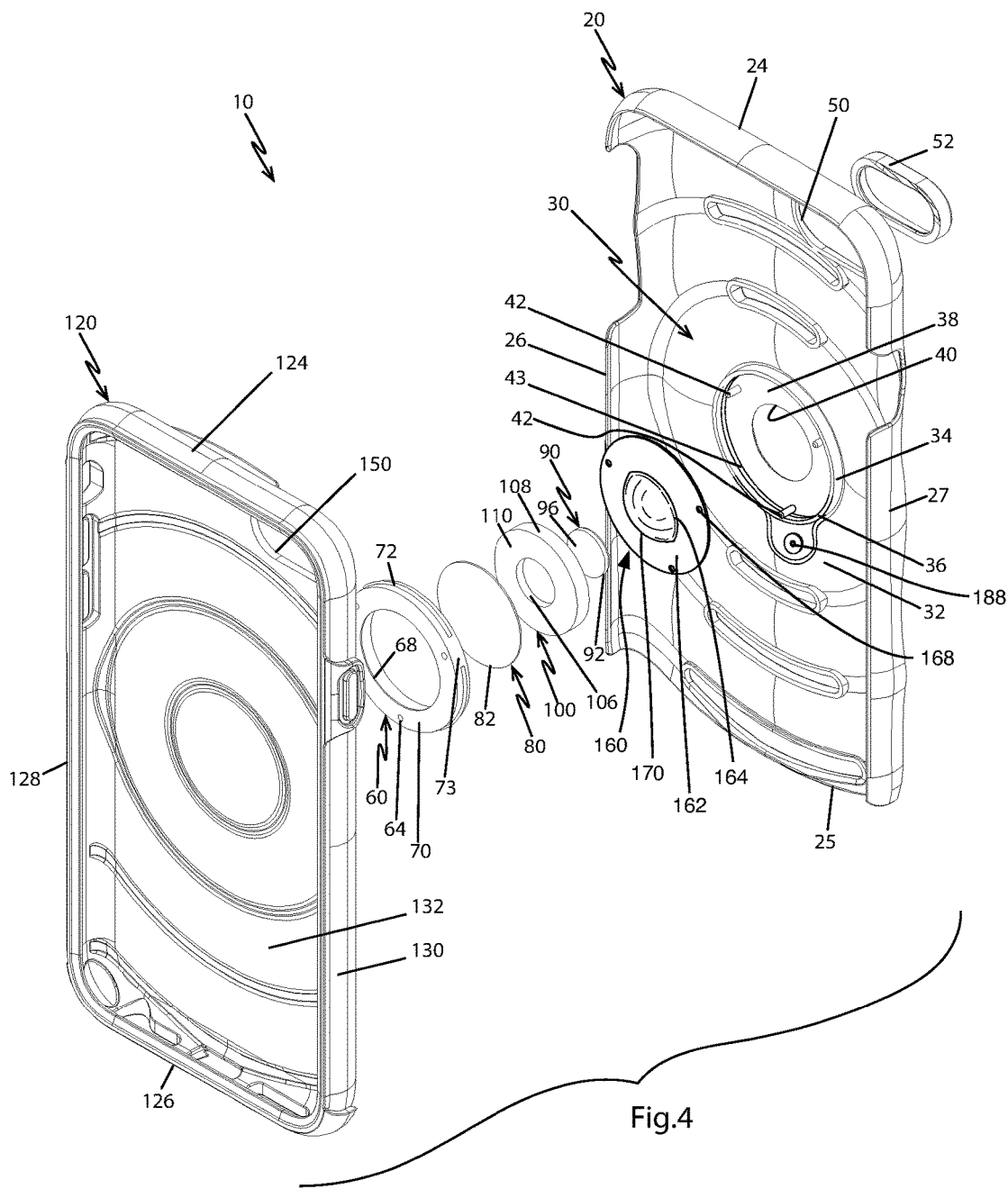
FIG. 4 is a rear exploded view of the utility case for electronic devices.

As seen in FIGS. 1 and 2, interior case 120 snugly fits within exterior case 20. Exterior case 20 comprises exterior face 22, top edge 24, bottom edge 25, lateral edges 26 and 27, and angled wall 28. Shield 160 has inner perimeter edge 164, as seen in FIG. 4. Interior edge 40 relatively aligns with inner perimeter edge 164 and concave face 166 aligns with a hole defined by interior edge 40, whereby concave face 166 is exposed at exterior face 22. Mounted onto exterior case 20 is exterior case ring 180, which is illustrated in a retracted position.

Figure 3:
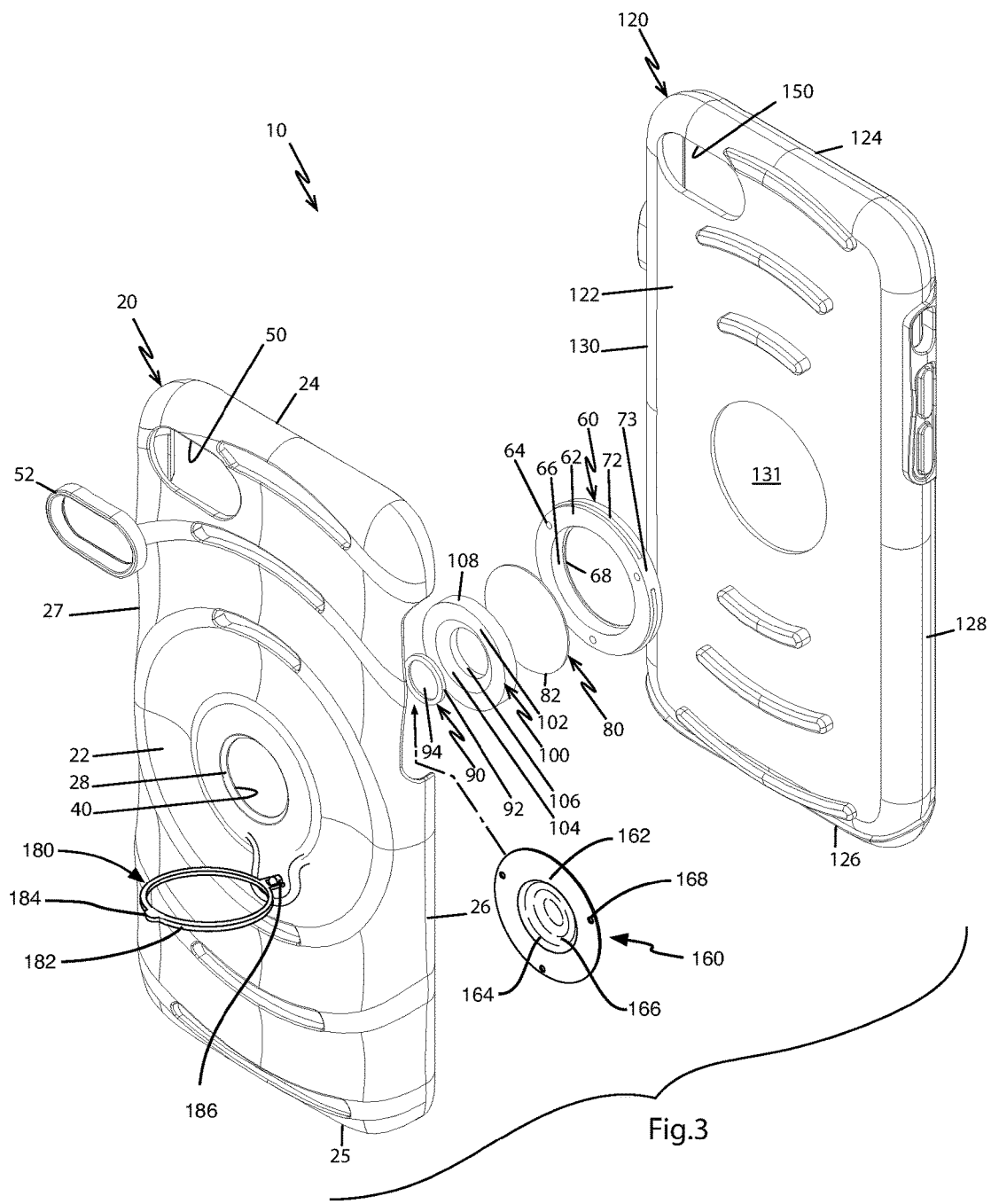
FIG. 3 is a front exploded view of the utility case for electronic devices.

As seen in FIGS. 3 and 4, exterior case 20 further comprises lock assembly 30 at interior face 32. Lock assembly 30 comprises containing wall edge inner side 36 having canal 43. In addition, lock assembly 30 comprises containing wall outer side 34, interior edge 40, containing wall interior face 38, and at least one post 42. In a preferred embodiment, lock assembly 30 comprises three posts 42. Exterior case 20 also comprises hole 50 to accommodate seal 52.

Magnet 100 comprises angled wall 104, inner sidewall 106, outer sidewall 108, flat wall 110, and external wall 102. Housing 60 comprises inner sidewall 66, locking face 70 having lip 68, outer sidewall 73 having ridge 72, and at least one hole 64 extending from locking face 70 to inner face 62. In a preferred embodiment, housing 60 comprises three holes 64.

Figure 5:
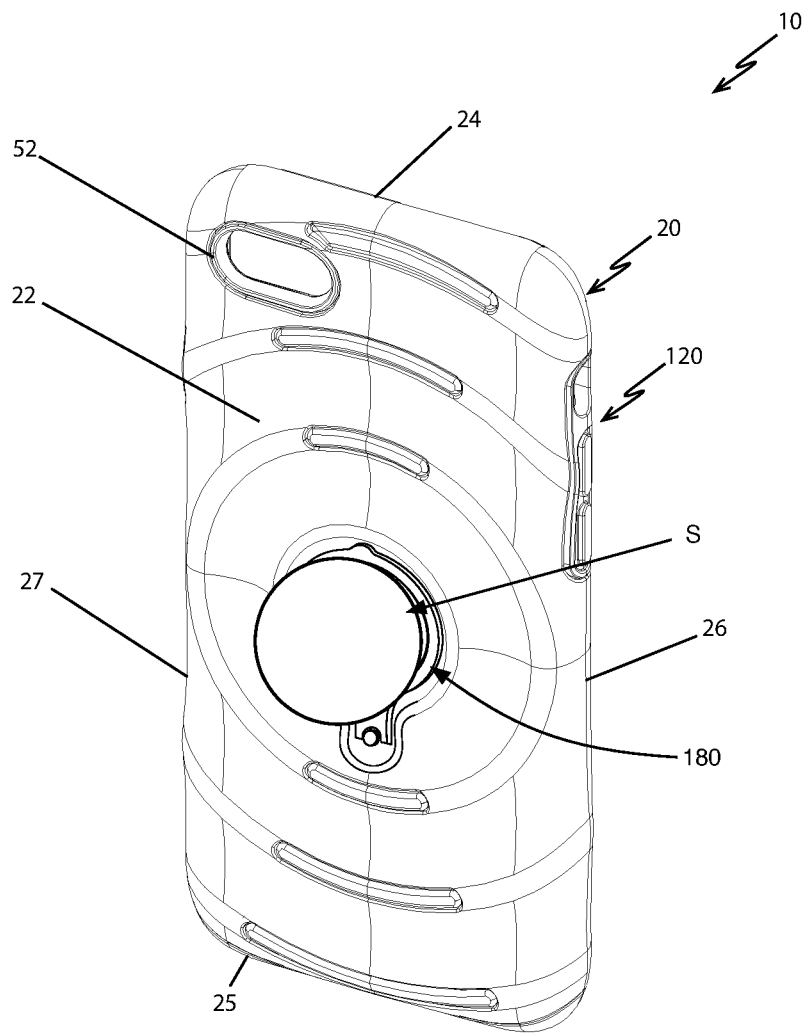
FIG. 5 is an isometric view of the utility case for electronic devices mounted onto a sphere.

Shield 160 has concave face 166 and convex face 170 defined by inner perimeter edge 164. Extending from inner perimeter edge 164 is perimeter wall 162. Perimeter wall 162 comprises at least one perimeter wall hole 168. In a preferred embodiment there are three perimeter wall holes 168. Shield 160 covers and protects magnet 100 to accommodate exterior case 20 onto sphere S, as seen in FIG. 5.

Insert 90 has flat face 96, insert sidewall 92 and concave face 94. Insert 90 fits within magnet 100, whereby an outside diameter of insert 90 is smaller than an inside diameter of inner sidewall 106. Magnet 100 adheres to plate 80, which has edge 82. Lip 68 contains plate 80 when housing 60 is placed onto lock assembly 30. Housing 60 is positioned between cavity 131 of interior case 120, and lock assembly 30. Shield 160 is positioned in between insert 90 and exterior case 20. When housing 60 is placed onto lock assembly 30, canal 43 receives ridge 72, and each perimeter wall hole 168 and each hole 64 receive a respective post 42.

Exterior case ring 180 comprises ring 182 having tab 184. Ring 182 is secured onto mounting pin 186. In a preferred embodiment, mounting pin 186 is fixed onto exterior case 20 with rivet 188. Exterior case ring 180 is illustrated in an extracted position, whereby a user may insert a finger within to secure present invention 10 or may be used to prop up present invention 10 when laying on a flat surface such as a desk.

Interior case 120 comprises interior face 122, top edge 124, bottom edge 126, lateral edges 128 and 130, interior face 132, and hole 150. In a preferred embodiment, interior case 120 is molded and/or manufactured to be slightly smaller in dimensions to snugly fit within exterior case 20. Although not illustrated, it is understood that interior case 120 is designed to snugly contain a computer such as, but not limited to, a cell phone, smart phone, tablet, or any other electronic device.

As seen in FIG. 5, present invention 10 may be mounted onto any surface attracted to magnet 100. As an example, present invention 10 may be mounted onto sphere S, whereby the spherical shape of sphere S is accommodated within angled wall 28 of exterior case 20 and angled wall 104 of magnet 100 as seen in FIGS. 3 and 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A utility case for electronic devices, comprising:
   A) an exterior case comprising a lock assembly at an interior face;
   B) a magnet;
   C) a housing;
   D) a plate;
   E) an insert;
   F) an interior case; and
   G) a shield comprising a concave face and a convex face, said shield is positioned in between said insert and said exterior case, and said housing is positioned in between said interior case and said exterior case when said housing is placed onto said lock assembly, said concave face and said convex face are defined by an inner perimeter edge, and extending from said inner perimeter edge is a perimeter wall.

2. The utility case for electronic devices set forth in claim 1, further characterized in that said perimeter wall comprises at least one perimeter wall hole.

3. The utility case for electronic devices set forth in claim 2, further characterized in that said lock assembly comprises a containing wall inner side.

4. The utility case for electronic devices set forth in claim 3, further characterized in that said containing wall inner side comprises a canal.

5. The utility case for electronic devices set forth in claim 4, further characterized in that said housing comprises an outer sidewall having a ridge.

6. The utility case for electronic devices set forth in claim 5, further characterized in that said canal receives said ridge when said housing is placed onto said lock assembly.

7. The utility case for electronic devices set forth in claim 3, further characterized in that said lock assembly comprises an interior edge.

8. The utility case for electronic devices set forth in claim 3, further characterized in that said lock assembly comprises a containing wall interior face.

9. The utility case for electronic devices set forth in claim 3, further characterized in that said lock assembly comprises at least one post.

10. The utility case for electronic devices set forth in claim 9, further characterized in that said housing comprises a locking face.

11. The utility case for electronic devices set forth in claim 10, further characterized in that said housing comprises at least one hole extending from said locking face to an inner face.

12. The utility case for electronic devices set forth in claim 11, further characterized in that said housing comprises a lip defined at said locking face.

13. The utility case for electronic devices set forth in claim 11, further characterized in that said at least one perimeter wall hole and said at least one hole receive a respective said at least one post when said shield and said housing are respectively placed onto said lock assembly.

14. The utility case for electronic devices set forth in claim 12, further characterized in that said insert fits within said magnet, said magnet adheres to said plate, and said plate is contained by said lip when said housing is placed onto said lock assembly.

15. The utility case for electronic devices set forth in claim 1, further characterized in that said magnet comprises an angled wall, an inner sidewall, and an outer sidewall.

16. The utility case for electronic devices set forth in claim 1, further characterized in that said magnet comprises a flat wall and an external wall.

17. The utility case for electronic devices set forth in claim 1, further comprising an exterior case ring.

* * * * *